United States Patent [19]
Gallup et al.

[11] Patent Number: 5,258,936
[45] Date of Patent: Nov. 2, 1993

[54] METHOD AND APPARATUS FOR GENERATING PSEUDO-RANDOM NUMBERS

[75] Inventors: Michael G. Gallup; L. Rodney Goke, both of Austin, Tex.

[73] Assignee: Motorola, Inc., Schaumburg, Ill.

[21] Appl. No.: 58,836

[22] Filed: May 10, 1993

Related U.S. Application Data

[63] Continuation of Ser. No. 924,984, Aug. 5, 1992, abandoned.

[51] Int. Cl.$^5$ .............................. G06F 1/02; G06F 7/00
[52] U.S. Cl. ................................. 364/717; 364/715.09
[58] Field of Search ........................ 364/717, 715.09; 380/46

[56] References Cited

U.S. PATENT DOCUMENTS

| | | | |
|---|---|---|---|
| 3,790,768 | 2/1974 | Chevalier et al. | 235/152 |
| 3,811,038 | 5/1974 | Reddaway | 235/152 |
| 3,838,259 | 9/1974 | Kortenhaus | 235/152 |
| 3,961,169 | 6/1976 | Bishop et al. | 364/717 |
| 4,047,008 | 9/1977 | Perkins | 235/152 |
| 4,142,239 | 2/1979 | Proto | 364/717 |
| 4,161,041 | 7/1979 | Butler et al. | 365/244 |
| 4,189,716 | 2/1980 | Krambeck | 364/715.09 X |
| 4,493,046 | 1/1985 | Watanabe | 364/717 |
| 4,607,176 | 8/1986 | Burrows et al. | 364/715.09 X |
| 4,630,192 | 12/1986 | Wassel et al. | 364/715.09 X |
| 4,667,301 | 5/1987 | Chiu | 364/717 |
| 4,771,429 | 9/1988 | Davis et al. | 371/27 |
| 4,780,840 | 10/1988 | Van Den Ende | 364/717 |
| 4,890,252 | 12/1989 | Wang | 364/717 |
| 4,905,176 | 2/1990 | Schulz | 364/717 |

OTHER PUBLICATIONS

Sybille Hellebrand, et al. "Generation of Vector Patterns Through Reseeding of Multiple-Polynomial Linear Feedback Shift Registers," International Test Conf. 1992, IEEE, pp. 120-129.

M. Morris Mano, "Computer System Architecture," 1976, Section 7: Central Processor Organization, pp. 232-243.

Frank F. Tsui; LSI/VLSI Testability Design; 1987; Chapter 7, pp. 169-212; Appendix C, pp. 559-584.

*Primary Examiner*—Tan V. Mai
*Attorney, Agent, or Firm*—Susan C. Hill

[57] ABSTRACT

A method and apparatus for generating pseudo-random numbers. A programmably selectable MASK value determines the polynomial to be used to generate the pseudo-random numbers. The MASK value can be changed while pseudo-random numbers are being generated in order to increase the run rate and improve the randomness of the sequence of pseudo-random numbers being generated. A programmably selectable SEED value is also used. The initial SEED value is used to generate the first pseudo-random number. The first pseudo-random number is then used as the NEW SEED value to generate the second pseudo-random number, and so on.

30 Claims, 2 Drawing Sheets 5,258,936

METHOD AND APPARATUS FOR GENERATING PSEUDO-RANDOM NUMBERS

This application is a continuation of prior application Ser. No. 07/924,984, filed Aug. 5, 1992 now abandoned.

FIELD OF THE INVENTION

The present invention relates in general to pseudo-random numbers, and more particularly to a method and apparatus for generating pseudo-random numbers.

BACKGROUND OF THE INVENTION

Unlike the generation of truly random numbers, the generation of pseudo-random numbers always produces the same output pattern given the same input pattern. However, there are many applications in which truly random numbers are not required and in which pseudo-random numbers are sufficient. For example, pseudo-random numbers can be used to generate test patterns for a data processing system. Pseudo-random numbers can also be used to represent noise in a data processing system. Additionally, pseudo-random numbers can be used to generate an initial state or value which acts as a pseudo-random starting point from which to start calculations. Some neural network systems require this type of pseudo-random starting point from which to start calculations. In addition, pseudo-random numbers may be used in data encryption and decryption. There are also other uses for pseudo-random numbers.

Existing pseudo-random number generators commonly use a linear-feedback shift-register (LFSR) to generate pseudo-random numbers. An LFSR is a multi-stage shift-register with feedback connections via exclusive-OR (XOR) gates. Outputs of the last stage and some intermediate stages are tapped and fed back to the first stage via XOR-gates. The first and last stages being the leftmost and rightmost bit-positions, respectively, if the register shifts left-to-right. In existing LFSRs, the polynomial which is used to generate the pseudo-random numbers is determined by the hardwired feedback connections from the various stages of the LFSR.

Existing pseudo-random number generators have the characteristic that the sequence of numbers produced by the generator will eventually repeat. Thus the "sequence" is the series of pseudo-random numbers which are generated before any repetition occurs. The "run length" is the number of pseudo-random numbers which are included in a sequence. For example, if a pseudo-random number generator generates the following pattern: 2, 6, 1, 2, 6, 1, 2, 6, 1; then the sequence would be 2, 6, 1. The run length would be three, because there are three numbers in the sequence. Note that increasing the run length improves the "randomness" of the pattern by ensuring that the sequence does not repeat as frequently.

SUMMARY OF THE INVENTION

The previously mentioned needs are fulfilled and other advantages achieved with the present invention. In one form, the present invention is an apparatus and a method for generating pseudo-random numbers.

In one embodiment, the present invention has logic circuitry for logically combining a first binary value and a second binary value to produce an intermediate binary value. The present invention also has additional logic circuitry for receiving the intermediate binary value from the previous logic circuitry and for producing a binary bit which has a first logic state if the intermediate binary value contains an odd number of ones, and which has a second logic state if the intermediate binary value contains an even number of ones. The logic circuitry uses the binary bit to determine a bit of a pseudo-random number.

The present invention will be understood by one skilled in the art from the detailed description below in conjunction with the accompanying drawings.

DESCRIPTION OF THE PREFERRED EMBODIMENT

By using a programmable MASK value, the present invention allows the same circuitry to generate pseudo-random numbers using different polynomials. Thus the same hardwired circuitry can produce many different sequences of pseudo-random numbers. In addition, the MASK value can be changed during generation of the pseudo-random numbers. By using more than one MASK value, the run length can be increased beyond that of a single sequence. In fact, using multiple MASK values allows the run length to be increased very significantly. Increasing the run length improves the "randomness" of a pattern by ensuring that the sequence does not repeat as frequently.

Figure 1:
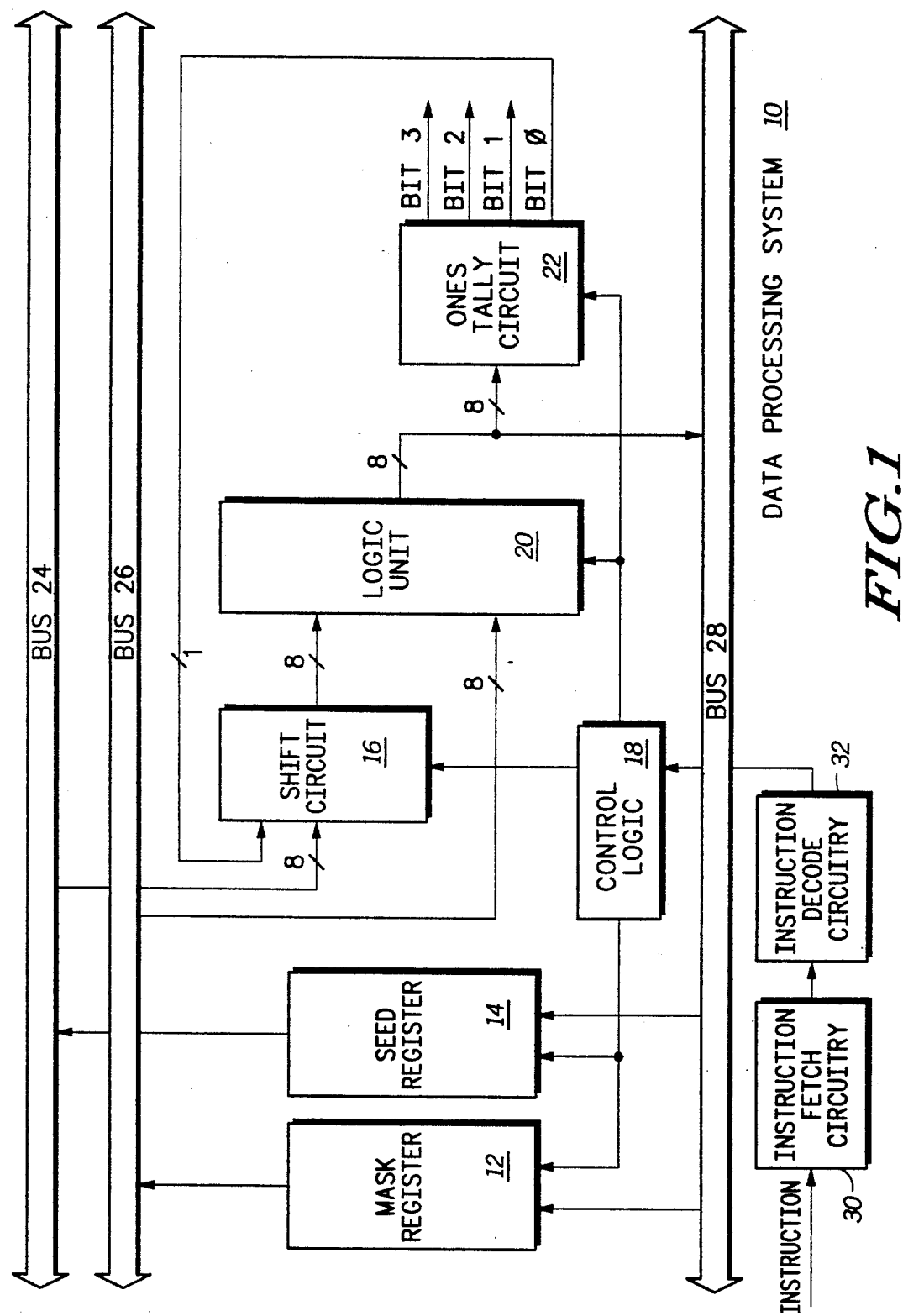
FIG. 1 illustrates, in block diagram form, an apparatus for generating pseudo-random numbers in accordance with one embodiment of the present invention.

FIG. 1 illustrates a digital data processing system 10 having a mask register circuit 12, a seed register circuit 14, a shift circuit 16, a control logic circuit 18, a logic unit circuit 20, a ones-tally circuit 22, a bus 24, a bus 26, and a bus 28.

Mask register 12 is coupled to bus 26, bus 28, and control logic 18. Seed register 14 is coupled to bus 24, bus 28, and control logic 18. Shift circuit 16 is coupled to logic unit 20, ones-tally circuit 22, bus 24, and control logic 18. Logic unit 20 is coupled to ones-tally circuit 22, bus 26, bus 28, and control logic 18. Ones-tally circuit 22 is coupled to control logic 18. Instruction fetch circuitry 30 is coupled to instruction decode circuitry 32. Instruction decode circuitry 32 is coupled to control logic 18. Instruction fetch circuitry 30 receives an instruction. Note that this instruction received by instruction fetch circuitry 30 may come from a memory (not shown) which is part of data processing system 10 or which is external to data processing system 10.

The operation of the present invention will now be described. Referring to FIG. 1, the value stored in mask register 12 is called "MASK". The value stored in seed register 14 at the beginning of the process is called "SEED". The value stored in seed register 14 at the end of the process is called "NEW SEED". Individual bits or bit fields will be indicated in brackets. For example, SEED[7:1] refers to bit seven through bit one inclusive of the value SEED.

The function performed by the ones-tally circuit 22 is called "ONES-TALLY". In essence, the ONES-TALLY operation counts or tallies the number of ones in a binary number. For example, ONES-TALLY (1101) equals three because there are three 1's in the binary number 1101. The four-bit output of the ones-tally circuit 22 is called OT[3:0]. The least significant bit of the output of the ones-tally circuit 22 is called OT[0].

Figure 2:
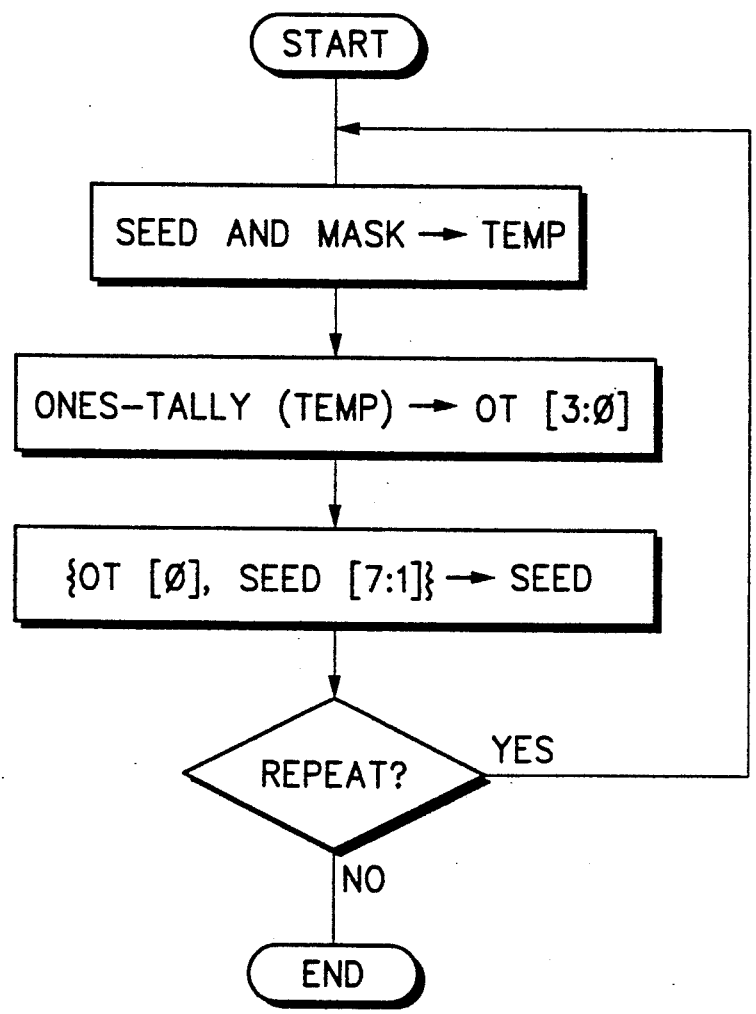
FIG. 2 illustrates, in flow diagram form, a method for generating pseudo-random numbers in accordance with one embodiment of the present invention.

Using the following steps in TABLE 1, pseudo-random numbers are generated in accordance with one embodiment of the present invention. Note that each of the three steps in TABLE 1 is illustrated in FIG. 2 as a rectangular box in the flow diagram. The binary numbers are included as an illustrative example of how each step is performed. The SEED values, including old SEED and NEW SEED represent individual numbers in a sequence of pseudo-random numbers.

TABLE 1

| | |
|---|---|
| step 1) | perform an AND operation |
| | SEED & MASK = (SEED & MASK) |
| | 11011010 & 10011011 = 10011010 |
| step 2) | perform a ones-tally operation |
| | ONES-TALLY (SEED & MASK) = OT[3:0] |
| | ONES-TALLY (10011010) = 0100 |
| step 3) | replace SEED value with NEW SEED value |
| | OT[0], SEED[7:1] = NEW SEED |
| | 0,1101101 = NEW SEED |
| | 01101101 = NEW SEED |

Referring to FIG. 1, each of the above three steps for generating pseudo-random numbers will now be described in detail.

The first step is a simple logical AND operation in which the SEED value in seed register 14 is ANDed with the MASK value in mark register 12. The MASK value is transferred to logic unit 20 across bus 26. The SEED value is transferred to logic unit 20 across bus 24 and through shift circuit 16. For the first step, shift circuit 16 does not perform any shifting function, but merely passes the SEED value through from bus 24 to logic unit 20. Although the MASK value and the SEED value in the illustrated embodiment of the present invention are each eight-bits, any convenient number of bits N could have been used. Under the control of control logic 18, the logic unit 20 ANDs together the SEED value and the MASK value and outputs the resulting eight-bit (SEED AND MASK) to the ones-tally circuit 22. The first step is now complete.

The second step is a ONES-TALLY operation. The ONES-TALLY operation counts or tallies the number of ones in a binary number. For example, ONES-TALLY (10011010) equals four because there are four 1's in the binary number 10011010. The four-bit output of the ones-tally circuit 22 is called OT[3:0]. The least significant bit of the output of the ones-tally circuit 22 is called OT[0]. Only the least significant bit of the output of the ones-tally circuit 22 is used in the illustrated embodiment of the present invention. Bits 1, 2, and 3 output by the ones-tally circuit 22 are not used in the illustrated embodiment. Ones-tally circuit 22 is known to one skilled in the art and may be implemented in any available manner, such as using adder cells or using XOR-gates. The second step is now complete.

The third step consists of generating a NEW SEED value and replacing the old SEED value with the NEW SEED value. As in the first step, the SEED value is transferred to logic unit 20 across bus 24 and through shift circuit 16. However, unlike the first step, shift circuit 16 now performs a shifting function as shift circuit 16 passes the SEED value through from bus 24 to logic unit 20. Shift circuit 16 shifts each bit of the SEED value one bit to the right, which effectively shifts old SEED[7] into NEW SEED[6] old SEED[6] into NEW SEED[5], old SEED[5] into NEW SEED[4], old SEED[4] into NEW SEED[3], old SEED[3] into NEW SEED[2], old SEED[2] into NEW SEED[1], and old SEED[1] into NEW SEED[0].

Note that the least significant bit of old SEED, SEED[0], is not needed to generate the NEW SEED value and can be discarded. The least significant bit from the output of the ones-tally circuit 22, OT[0], is shifted in as the most significant bit of the NEW SEED value. Thus the NEW SEED value is generated by right shifting the old SEED value one bit and by inserting OT[0] as the most significant bit of the NEW SEED value.

Note that in alternate embodiments of the present invention, the NEW SEED value could be generated instead by left shifting the old SEED value one bit and by inserting OT[0] as the least significant bit of the NEW SEED value. Note also that the left shift function could be performed by an adder. For example, the adder could add the old SEED value to the old SEED value while using OT[0] as a carry-in input. Shift circuit 16 and logic circuit 20 could be combined to form an arithmetic logic unit (ALU).

For the third step, logic unit 20 does not perform any logical operation, but merely passes the NEW SEED value through from shift circuit 16 to bus 28. The NEW SEED value is then written into seed register 14. In the illustrated embodiment of the present invention, the NEW SEED value overwrites the old SEED value in seed register 14. The third step is now complete.

Note that logic unit 20 may effectively pass through the NEW SEED value in many different ways. In some embodiments of the present invention, logic unit 20 may be capable of performing logical operations besides the logical AND operation. In other embodiments of the present invention, logic unit 20 may be an arithmetic logic unit (ALU) which can perform both logical and arithmetic operations.

Although logic unit 20 may actually just pass the NEW SEED value through without performing any operation, logic unit 20 may instead perform a logical or arithmetic operation which does not change the NEW SEED value which is output. For example, logic unit 20 may logically AND the NEW SEED value with all ones. Logic unit 20 may logically OR the NEW SEED value with all zeros. Logic unit 20 may perform an addition or subtraction operation using all zeros as the second operand.

The old SEED value is one number in a sequence of pseudo-random numbers. The NEW SEED value, which is generated by the three step procedure illustrated in TABLE 1, is the next number in the sequence of pseudo-random numbers. The NEW SEED value then becomes the old SEED value which is used to generate the next number in the sequence of pseudo-random numbers. Thus each SEED value is used to generate the subsequent number in a sequence of pseudo-random numbers. Note that the NEW SEED value, which is the newest pseudo-random number, may be transmitted to other parts of data processing system 10, or even transmitted external to data processing system 10 by means of bus 24, and possibly additional busses (not shown) which are coupled to bus 24.

Referring to FIG. 1, note that two passes through shift circuit 16 and logic unit 20 are required in the illustrated embodiment of the present invention in order to generate the next pseudo-random number. In the first pass, logic unit 20 is used, but shift logic 16 is not used. In the second pass, shift logic 16 is used, but logic unit 20 is not used. The ones-tally circuit 22 is only used between passes through shift circuit 16 and logic unit 20. The MASK value stored in mask register 12 is only used in the first pass through shift circuit 16 and logic unit 20.

Using bus 28, a user can load a desired SEED value into seed register 14. Once a user programs an initial SEED value into seed register 14, the SEED value stored in seed register 14 is continuously updated by the pseudo-random number generation procedure which is described in TABLE 1 above. The user may, but need not, change the SEED value in the seed register 14 by loading in a new value across bus 28.

Also using bus 28, a user can load a desired MASK value into mask register 12. Once a user programs an initial MASK value into mask register 12, the MASK value stored in mask register 12 is not changed or affected by the pseudo-random number generation procedure which is described in TABLE 1 above. The user may, but need not, change the MASK value in the mask register 12 by loading in a new value across bus 28.

The MASK value is used to select, under program control, which polynomial is to be used in the generation of the pseudo-random numbers. The MASK value is used to zero out all of the non-zero SEED coefficients that are not to be included in the polynomial. For each bit location of MASK that has a binary zero value, the corresponding coefficient of the polynomial is not used. And for each bit location of MASK that has a binary one value, the corresponding coefficient of the polynomial is used.

Thus, unlike the prior art linear-feedback shift-registers (LFSRs) which could only be hardwired for one polynomial, the present invention allows the user to select, under program control, any possible polynomial. Thus the user is able to generate a multitude of pseudo-random number sequences rather than just one pseudo-random number sequence.

In addition to selecting an initial value for MASK under program control, the user is allowed to change the MASK value in mask register 12 even while a sequence of pseudo-random numbers is being generated. Changing the MASK value has the effect of changing the polynomial which is being used to generate the pseudo-random numbers. Changing the polynomial has the effect of changing the sequence of pseudo-random numbers. And changing the sequence of pseudo-random numbers before the sequence repeats can have the effect of extending the sequence.

Thus, by continuing to change the MASK value before the overall sequence repeats, the run length of the overall sequence can be greatly extended. This dramatically improves the randomness of the overall sequence by ensuring that the overall sequence rarely repeats. This is a significant advantage of the present invention.

The run length of a prior art linear-feedback shift-register (LFSR) is not greater than $2^N - 1$ pseudo-random numbers, where N is the number of stages in the LFSR. The run length of the present invention using a single MASK value also can be as many as $2^N - 1$ pseudo-random numbers, where N is the number of bits in the SEED value. However, by changing the MASK value during the generation of pseudo-random numbers, the run length of the present invention can be greatly increased beyond the $2^N - 1$ limit of the prior art LFSRs. Carrying the idea of changing the MASK value to its full extreme, the user is able to select a different polynomial by changing the MASK value each time a pseudo-random number is generated.

The three steps described in TABLE 1 herein above may together form one instruction which can be executed by data processing system 10. Thus, this one instruction is executed each time that a new pseudo-random number is to be generated. So in order to generate "M" pseudo-random numbers, this one instruction is executed M times. This one instruction may be used as part of a software loop which allows the instruction to execute a selected number of times.

Alternately, each of the three steps, or portions of the three steps may be divided up into one or more instructions which may be used together to perform the three steps described in TABLE 1.

Alternately, one instruction may include a parameter, possibly in the form of a bit field, which designates how many times the three steps in TABLE 1 are to be repeated, thus how many pseudo-random numbers are to be generated for one execution of the instruction. Thus one instruction may be used to generate a plurality of pseudo-random numbers.

Note that the SEED value and the MASK value may be used as arguments for an instruction which executes the three steps described in TABLE 1. The instruction itself may include the SEED value as a field and the MASK value as a field. If the SEED and MASK values are part of the instruction itself, then the mask register 12 and the seed register 14 may act as temporary storage for the instruction fields.

Alternately, two register locations, such as data register 0 and data register 1, may be used as arguments for an instruction which executes the three steps described in TABLE 1. In this case, the two registers which are designated must be preloaded with the desired values of SEED and MASK. Alternatively, an instruction which executes the three steps in TABLE 1 may not require any arguments, but may merely use the existing value stored in a first predetermined storage location as the SEED value and the existing value stored in a second predetermined storage location as the MASK value.

A preferred embodiment will now be discussed. In a preferred embodiment, a "RAND" instruction is used to generate a random number by performing the three steps illustrated in TABLE 1. The RAND instruction includes two arguments. The first argument is a source register identifier which is used to determine the location of the register containing the SEED value. The second argument is a source register identifier which is used to determine the location of the register containing the MASK value. In the preferred embodiment, mask register 12 and seed register 14 are each one of a plurality of general purpose data registers. In the preferred embodiment, the NEW SEED value is used to overwrite the SEED value in the designated seed register 14.

In the preferred embodiment, the functionality performed by shift circuit 16 and logic unit 20 is combined into an arithmetic logic unit (ALU) (not shown) which has multiplexing capability at the inputs that can perform a shifting operation. The ones-tally circuit 22 is implemented using five full adder circuits.

The RAND instruction is fetched from either internal or external memory (not shown) by the instruction fetch circuitry 30. The instruction decode circuitry 32 decodes the RAND instruction and transmits the proper control information to control logic 18. Control logic 18 then transmits the proper control signals in order to carry out the RAND instruction. In the preferred embodiment, a right shift is performed and the OT[0] is used to determine the logic state of the most significant bit of the NEW SEED value.

In summation, the above specification describes a method and apparatus for generating pseudo-random numbers. The present invention allows the user to select, under program control, the MASK value which determines the polynomial to be used to generate the pseudo-random numbers. In fact, the user can change the MASK value while pseudo-random numbers are being generated in order to increase the run length and improve the randomness of the sequence of pseudo-random numbers being generated.

The present invention also allows the user to select the initial SEED value under program control. The initial SEED value is used to generate the first pseudo-random number. The first pseudo-random number is then used as the NEW SEED value to generate the second pseudo-random number, and so on. Although the procedure for generating pseudo-random numbers does not require the user to change either the MASK value or the SEED value, the user is free to change either or both the MASK value or the SEED value while pseudo-random numbers are being generated.

In one embodiment of the present invention illustrated in FIG. 1, shift circuit 16, logic circuit 20, ones-tally circuit 22, busses 24, 26, and 28, and portions of control logic 18 were already being used by data processing system 10 for other functions unrelated to the present invention. Mask register 12 and seed register 14 already existed as general purpose data registers. Thus by adding a portion of control logic 18 and a feedback path from the ones-tally circuit 22 to the shift circuit 16, data processing system 10 was now able to perform the additional function of generating pseudo-random numbers.

While the present invention has been illustrated and described with reference to specific embodiments, further modifications and improvements will occur to those skilled in the art. For example, various circuits could be used to implement any of the circuits 12, 14, 16, 18, 20, and 22 illustrated in FIG. 1. Busses 24, 26, and 28 could be combined into one bi-directional bus, or could be further split out into more individual busses. Other circuitry and logic (not shown) may be included in data processing system 10 and may be coupled to various busses.

As bits 1-3 of ones-tally circuit 22 are not required, alternate embodiments of the present invention may not generate these bits. For example, a network of two-input XOR-gates (not shown) may be used to produce OT[0] using less circuitry and without outputting OT[3:1]. OT[0] represents whether the total number of 1's in a binary number is odd or even. Note that the function performed by the ones-tally circuit 22 in generating OT[0] is equivalent to a parity function. Thus the ones-tally circuit 22 could be replaced by a parity circuit. If the total number of 1's in a binary number is odd, OT[0] will be one; and if the total number of 1's in a binary number is even, OT[0] will be zero.

Note that $\overline{OT[0]}$, the complemented value of OT[0], may be used in place of OT[0] in generating the NEW SEED value. Using $\overline{OT[0]}$ instead of OT[0] would produce a different NEW SEED value; but the NEW SEED value produced would still be a psuedo-random number.

Note also that $\overline{(SEED\ AND\ MASK)}$, the complemented value of (SEED AND MASK), may be used in place of (SEED AND MASK) in generating the NEW SEED value. $\overline{(SEED\ AND\ MASK)}$ is the Boolean logic equivalent of logically ORing $\overline{SEED}$ with $\overline{MASK}$. Thus the step of performing a logical AND operation using SEED and MASK as the operands may be replaced with the step of performing a logical OR operation using $\overline{SEED}$ and $\overline{MASK}$ as the operands. Thus, logic unit 20 may perform a logical OR operation rather than a logical AND operation. In either case, however, logic unit 20 performs a logical combination of either a true or complement value of a SEED value and a MASK value.

In addition to (SEED AND MASK) and $\overline{(SEED\ OR\ MASK)}$, other combinations of logical functions and complimentary or non-complementary values may be used, such as $\overline{(SEED\ AND\ MASK)}$, (SEED AND $\overline{MASK}$), ($\overline{SEED}$ AND $\overline{MASK}$), (SEED OR MASK), ($\overline{SEED}$ OR MASK), or (SEED OR $\overline{MASK}$).

One embodiment of the present invention illustrated in FIG. 1 uses five full-adder stages to implement the ones-tally circuit 22 because the entire four-bit output of the ones-tally circuit 22 is required for an unrelated function (not shown) of the data processing system 10. The ones-tally circuit 22 in one embodiment of the present invention is implemented using XOR-gates (not shown) and NAND gates (not shown).

In alternate embodiments of the present invention, the ones-tally circuit 22 could be implemented using any combination of gates which produces the ONES-TALLY function. Assuming "N" is the number of bits input to the ones-tally circuit 22, and assuming that N is a power of two, then the ones-tally circuit 22 illustrated in FIG. 1 produces $[\log_2(N)]+1$ number of bits in the result. For a SEED value using N=8 bits, the number of bits output by the ones-tally circuit 22 is $[\log_2(8)]+1$ bits, or $3+1$ bits, or 4 bits.

Although the embodiment of the present invention illustrated in FIG. 1 uses an eight-bit MASK value, the MASK value may be any number of bits. Likewise, although the embodiment of the present invention illustrated in FIG. 1 uses an eight-bit SEED value, the SEED value may be any number of bits. Note that the number of bits in the MASK value may be more, fewer, or the same number of bits as the bits in the SEED value. However, if there are more bits in the MASK value than in the SEED value, the extra MASK value bits will merely have no effect. And if there are fewer bits in the MASK value than in the SEED value, then the missing MASK value bits cannot be used to zero out any non-zero SEED coefficients.

It is to be understood, therefore, that this invention is not limited to the particular forms illustrated and that it is intended in the appended claims to cover all modifications that do not depart from the spirit and scope of this invention.

We claim:

1. An apparatus for generating pseudo-random numbers, comprising:

a first circuit which logically combines a first binary value and a second binary value to produce an intermediate binary value; and a second circuit which is coupled to said first circuit, which receives the intermediate binary value from said first circuit, and which produces a binary bit which has a first logic state if the intermediate binary value contains an odd number of ones and which has a second logic state if the intermediate binary value contains an even number of ones, said second circuit using the binary bit to determine a bit of a pseudo-random number.

2. An apparatus as in claim 1, wherein said first circuit performs a logical AND operation using the first binary value and the second binary value as operands.

3. An apparatus as in claim 1, wherein the binary bit is a most significant bit of the pseudo-random number.

4. An apparatus as in claim 1, wherein said second circuit comprises:
a ones-tally circuit.

5. An apparatus as in claim 1, wherein said second circuit comprises:
a shifting circuit for shifting the first binary value.

6. An apparatus as in claim 5, further comprising:
control circuitry, coupled to said shifting circuit, for selecting between a shift operation and a no-shift operation.

7. An apparatus as in claim 6, further comprising:
a first storage circuit for storing the first binary value, said first storage circuit being coupled to said first circuit.

8. An apparatus as in claim 7, further comprising:
a second storage circuit for storing the second binary value, said second storage circuit being coupled to said first circuit.

9. An apparatus as in claim 8, wherein said control circuitry also controls read accesses and write accesses to said first storage circuit and to said second storage circuit.

10. An apparatus as in claim 9, wherein said second circuit produces the pseudo-random number by shifting each bit of the first binary value by one bit and by shifting in the binary bit as the most significant bit of the pseudo-random number.

11. An apparatus as in claim 10, wherein the pseudo-random number is also used as a next first binary value which is logically combined with the second binary value.

12. A method for generating a pseudo-random number value in a data processing system, the data processing system having a plurality of registers and having a circuit for performing a logical combination function coupled to a circuit for producing a control signal, the method comprising the steps of:
transferring, from a first one of the plurality of registers to a first bus, a first plurality of electrical signals which represent a first value;
transferring, from a second one of the plurality of registers to a second bus, a second plurality of electrical signals which represent a second value;
logically combining the first plurality of electrical signals which represent the first value and the second plurality of electrical signals which represent a second value to produce an intermediate value;
placing the control signal in a first logic state if a number of ones in a binary representation of the intermediate value is odd; and
generating a pseudo-random number value based upon the first value and the control signal.

13. The method according to claim 12, wherein said step of logically combining further comprises the step of:
performing a logical AND operation.

14. The method according to claim 12, further comprising the step of:
placing the control signal in a second logic state if the number of ones in a binary representation of the intermediate value is even.

15. The method according to claim 12, wherein said step of generating a pseudo-random number value further comprises the step of:
using the control signal to determine a logic state of a bit of the pseudo-random number value.

16. The method according to claim 15, wherein the bit of the pseudo-random number value is a most significant bit.

17. The method according to claim 15, wherein said step of generating a pseudo-random number value further comprises the step of:
shifting the first value by one bit place.

18. The method according to claim 12, further comprising the steps of:
storing an initial first value in the first one of the plurality of registers; and
storing an initial second value in the second one of the plurality of registers.

19. The method according to claim 12, further comprising the step of:
repeating said step of logically combining, said step of placing the control signal in the first logic state, and said step of generating a pseudo-random number value using a previous pseudo-random number value as the first value.

20. The method according to claim 12, wherein the method is initiated by decoding a single instruction.

21. The method according to claim 12, wherein the first value is a pseudo-random number.

22. A method for operating a digital data processor comprising the steps of:
decoding an instruction; and
performing, in response to said decoding of the instruction, the steps of:
1) retrieving a first value from a first storage circuit;
2) retrieving a second value from a second storage circuit;
3) logically combining the first value and the second value to produce an intermediate value;
4) placing a binary bit in a first logic state if a number of ones in a binary representation of the intermediate value is odd; and
5) generating a pseudo-random number based upon the first value and the binary bit.

23. The method according to claim 22, wherein said step of logically combining comprises the step of:
performing a logical AND operation.

24. The method according to claim 22, wherein said step of generating a pseudo-random number comprises the step of:
using the binary bit as one bit of the pseudo-random number.

25. The method according to claim 24, wherein a most significant bit of the pseudo-random number is the binary bit.

26. An apparatus for generating pseudo-random numbers, comprising:
first storage circuit for storing a first binary value;
second storage circuit for storing a second binary value;
ANDing circuit for logically ANDing the first binary value and the second binary value to produce an intermediate binary value, said ANDing circuit being coupled to said first storage circuit and said second storage circuit; and logic circuit for receiving the intermediate binary value from said ANDing circuit and for placing a binary bit in a first logic state if the intermediate binary value contains an odd number of ones, said logic circuit using the first binary value and the binary bit to generate a pseudo-random number.

27. An apparatus for generating a pseudo-random number, comprising:

a storage circuit for storing a previously generated pseudo-random number;

a programmable register circuit for storing a mask value; and circuitry, coupled to said storage circuit for receiving the previously generated pseudo-random number and coupled to said programmable register circuit for receiving the mask value, said circuitry using the mask value to select which bits of the previously generated pseudo-random number are masked, said circuitry generating the pseudo-random number based upon the previously generated pseudo-random number and the mask value.

28. An apparatus as in claim 27, wherein said circuitry comprises:

an arithmetic logic unit.

29. An apparatus as in claim 27, wherein the pseudo-random number is generated during execution of an instruction.

30. An apparatus as in claim 27, wherein said storage circuit is user programmable.

* * * * *